US012676485B2

(12) United States Patent
Kondo

(10) Patent No.: US 12,676,485 B2
(45) Date of Patent: Jul. 7, 2026

(54) CONTROLLER, NON-TRANSITORY COMPUTER-READABLE MEDIUM, AND CONTROL METHOD

(71) Applicant: HONDA MOTOR CO., LTD., Tokyo (JP)

(72) Inventor: Seiichiro Kondo, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/937,033

(22) Filed: Nov. 5, 2024

(65) Prior Publication Data

US 2025/0149893 A1    May 8, 2025

(30) Foreign Application Priority Data

Nov. 6, 2023    (JP) ................................. 2023-189476

(51) Int. Cl.
| | |
|---|---|
| *H02J 3/32* | (2026.01) |
| *B60L 53/60* | (2019.01) |
| *G06Q 30/0207* | (2023.01) |
| *G06Q 50/06* | (2024.01) |

(52) U.S. Cl.
CPC .............. *H02J 3/322* (2020.01); *B60L 53/60* (2019.02); *G06Q 30/0236* (2013.01); *G06Q 50/06* (2013.01)

(58) Field of Classification Search
None
See application file for complete search history.

(56) References Cited

U.S. PATENT DOCUMENTS

| | | | |
|---|---|---|---|
| 2016/0075247 A1 * | 3/2016 | Uyeki | H02J 3/00 |
| | | | 455/456.3 |
| 2021/0252993 A1 * | 8/2021 | Kinomura | G06Q 20/202 |
| 2022/0242271 A1 | 8/2022 | Orihashi et al. | |
| 2023/0191941 A1 * | 6/2023 | Naito | B60L 53/53 |
| | | | 701/22 |
| 2024/0037597 A1 * | 2/2024 | Yumita | G06Q 30/0236 |
| 2024/0160263 A1 * | 5/2024 | Tomita | G06F 1/26 |

FOREIGN PATENT DOCUMENTS

JP        2022116975 A      8/2022

* cited by examiner

*Primary Examiner* — Daniel C Puentes
*Assistant Examiner* — Joel Barnett
(74) *Attorney, Agent, or Firm* — CKC & Partners Co., LLC

(57) ABSTRACT

A controller according to an embodiment includes a determiner and an output controller. The determiner determines a number of participants representing a number of electric power sources that are able to actually participate in supplying of electric power to an electric system. The output controller causes each of the electric power sources that are able to actually participate in the supplying to output, to the electric system, an electric energy determined by dividing a predetermined electric energy by the number of participants. The controller according to the embodiment may further include a granter. The granter grants an incentive to users who use the electric power sources that actually participate in the supply.

5 Claims, 5 Drawing Sheets

CONTROLLER, NON-TRANSITORY COMPUTER-READABLE MEDIUM, AND CONTROL METHOD

This application is based on and claims the benefit of priority from Japanese Patent Application No. 2023-189476, filed on Nov. 6, 2023, the content of which is incorporated herein by reference.

BACKGROUND OF THE INVENTION

Field of the Invention

The present invention relates to a controller, a non-transitory computer-readable medium, and a control method.

Related Art

In a vehicle-to-grid (V2G) system according to a prior art, a vehicle of each user having registered to participate in supplying of electric power to be bid on in an electric power market is set to either participation at a maximum output or non-participation. Then, in the V2G system according to the prior art, an incentive for supplying electric power is granted equally to all users who actually participate. Otherwise, in the V2G system according to the prior art, an incentive for supplying electric power is granted equally to all users who have registered to participate.

Patent Document 1: Japanese Unexamined Patent Application, Publication No. 2022-116975

SUMMARY OF THE INVENTION

In a case where incentives are granted to all registered participants, regardless of participation, the participation ratio will decrease because people can receive the incentive even if they do not participate. Furthermore, in a case where incentives are only granted to users who actually participate, a user who has registered to participate and who may have opened their vehicle's schedule for participation but did not participate, for example, may feel a sense of unfairness. Thereby, motivation for registering to participate may decrease.

Furthermore, when participation registration and participation ratio decrease, electric power and electric energy that is able to be supplied will decrease. Furthermore, when participation registration and participation ratio decrease, the electric energy may become insufficient with respect to electric power that has been bid for.

An object of an embodiment of the present invention is to provide a controller, a non-transitory computer-readable medium, and a control method that make it possible to increase participation registration and a participation ratio in supplying of electric power.

A controller according to an embodiment includes a determiner and an output controller. The determiner determines a number of participants representing a number of electric power sources that are able to actually participate in supplying of electric power to an electric system. The output controller causes each of the electric power sources that are able to actually participate in the supplying to output, to the electric system, an electric energy determined by dividing a predetermined electric energy by the number of participants.

The present invention makes it possible to increase participation registration and a participation ratio in supplying of electric power.

DETAILED DESCRIPTION OF THE INVENTION

Figure 1:
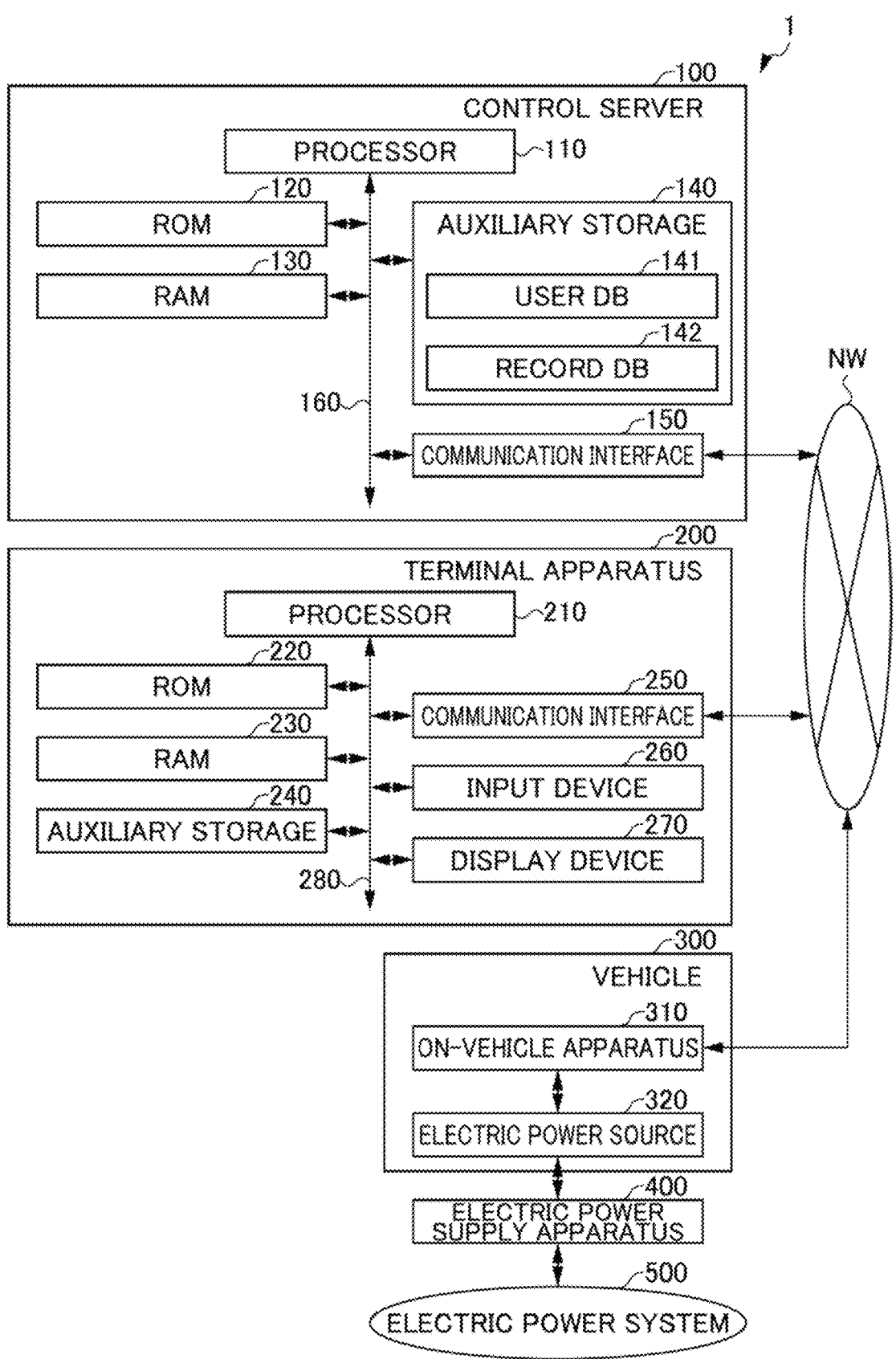
FIG. 1 is a block diagram illustrating an example of a V2G system according to an embodiment and a main part configuration of components included in the V2G system.

A V2G system according to an embodiment will now be described herein with reference to the accompanying drawings. Note that, in the drawings used to describe below the embodiment, there may be cases where the scale of each of components is appropriately changed. Furthermore, in the drawings used to describe below the embodiment, some configurations may be omitted for the purpose of description. Furthermore, in the drawings and the specification, identical reference numerals represent similar or identical elements. FIG. 1 is a block diagram illustrating an example of a V2G system 1 according to the embodiment and a main part configuration of components included in the V2G system 1. Note that the components in the apparatus may be mounted internally or externally. The V2G system 1 represents a system that is controlled by a control server 100 to cause electric power that a vehicle 300 outputs to be supplied to an electric power system 500. The V2G system 1 includes, as an example, the control server 100, a terminal apparatus 200, the vehicle 300, an electric power supply apparatus 400, and the electric power system 500. Note that the V2G system 1 may include some of the components. Furthermore, there is no limitation in a number of the components that the V2G system 1 includes. The V2G system 1 typically includes a plurality of the terminal apparatuses 200, a plurality of the vehicles 300, and a plurality of the electric power supply apparatuses 400.

The control server 100, the terminal apparatuses 200, the vehicles 300, and the electric power supply apparatuses 400 are coupled to a network NW. The network NW is typically a communication network including the Internet. The network NW is typically a communication network including a wide area network (WAN). The network NW may be a communication network including a private network such as an intranet. The network NW may be a communication network including a local area network (LAN). Furthermore, the network NW may include a wireless channel or a wired channel, or may include a wireless channel and a wired channel in a mixed manner. Furthermore, the network NW may be a communication network including an exclusive line or a public mobile phone network, for example. The electric power system 500 may be coupled to the network NW.

The control server 100 represents an apparatus that controls supplying of electric power from each of the plurality of vehicles 300 to the electric power system 500, for example. The control server 100 is used by an aggregator, for example. The control server 100 includes, as an example, a processor 110, a read-only memory (ROM) 120, a random-access memory (RAM) 130, an auxiliary storage 140, and a communication interface 150. Then, a bus 160 couples these components, for example. Note that the control server 100 represents an example of a controller.

The processor 110 serves as a central part of a computer that performs processing such as calculation and control necessary for operating the control server 100, and that performs various types of calculation and processing, for example. The processor 110 is, for example, a central processing unit (CPU), a micro processing unit (MPU), a system on a chip (SoC), a digital signal processor (DSP), a graphics processing unit (GPU), an application specific integrated circuit (ASIC), a programmable logic device (PLD), or a field-programmable gate array (FPGA). Otherwise, the processor 110 is a combination of a plurality of those described above. Furthermore, the processor 110 may be a combination of those described above and a hardware accelerator, for example. The processor 110 controls the components to achieve various types of functions of the control server 100 based on programs, such as firmware, system software, and application software, stored in the ROM 120 or the auxiliary storage 140, for example. Furthermore, the processor 110 executes processing described later based on the programs. Note that some or all of the programs may be incorporated into a circuit in the processor 110.

The ROM 120 and the RAM 130 represent main storage devices for the computer that includes the processor 110 as a core component. The ROM 120 represents a non-volatile memory mainly used to read data. The ROM 120 stores the firmware, for example, among the programs described above. Furthermore, the ROM 120 further stores, for example, data that the processor 110 uses for performing various types of processing.

The RAM 130 represents a memory used to read and write data. The RAM 130 is utilized, for example, as a work area for storing data that the processor 110 uses on a temporal basis for performing various types of processing. The RAM 130 typically represents a volatile memory.

The auxiliary storage 140 represents an auxiliary storage for the computer that includes the processor 110 as the core component. The auxiliary storage 140 is, for example, an electric erasable programmable read-only memory (EE-PROM), a hard disk drive (HDD), or a flash memory. The auxiliary storage 140 stores, for example, the system software and the application software, among the programs described above. Furthermore, the auxiliary storage 140 further stores, for example, data that the processor 110 uses for performing various types of processing, data generated through the processing in the processor 110, and various types of set values. The data that the auxiliary storage 140 stores includes a user database (DB) 141 and a record DB 142.

The user DB 141 represents a database for storing and managing data related to users who utilize the V2G system. The user DB 141 stores, for each of the users, a user ID (an identifier) and user information in an associated manner. The user ID represents identification information that is unique to each of the users. The user information represents information related to the user identified by the associated user ID. The user information includes, for example, output apparatus information, record information, incentive information, increase-or-decrease information, and participation setting information.

The output apparatus information represents information that identifies the vehicle 300 and the electric power supply apparatus 400 that the user uses for supplying of electric power. The vehicle 300 and the electric power supply apparatus 400 are able to output electric power to the electric system 500 based on control by the control server 100.

The record information represents information that indicates records of participation in supplying of electric power. The record information includes registration record information and participation record information. The registration record information represents information that indicates records of registration for participation in supplying of electric power. The participation record information includes information that indicates records of whether or not participation in supplying of electric power has been actually performed. Note that "registration for participation in supplying of electric power" will be hereinafter referred to as "participation registration".

The incentive information represents information that indicates amounts of incentives granted to the user. The control server 100 grants an incentive to a user that participates in supplying of electric power. The incentive is represented in the form of, for example, currency or electronic money. The incentive may be in the form of points. The incentive may be in the form of one or more of currency, electronic money, and points.

The increase-or-decrease information represents information that indicates an increase-or-decrease value of an incentive to be granted to the users. The increase-or-decrease value represents a value used to increase or decrease an amount of an incentive to be granted to the user. The increase-or-decrease value is determined, for example, based on the record information. The increase-or-decrease value is not limited to a number equal to or greater than 0, but may be a negative value.

The participation setting information represents information that specifies a condition for automatically participating in supplying of electric power. The condition is settable by the user beforehand. The condition is, for example, within a period of time that is set beforehand. It is possible to set, as the period of time, for example, a midnight time slot or a daytime time slot.

The record DB 142 represents a database for storing and managing data related to participation records of the users in supplying of electric power. The record DB 142 includes, as an example, a registration list table and a supply table.

The registration list table represents information that indicates, in a state of a table, a list of the users having undergone participation registration. The user having undergone participation registration indicates that the vehicle 300 that the user uses is planned to participate in supplying of electric power. The registration list table stores, for example, each of the user IDs, each of supply IDs, and participation information in an associated manner. The supply ID represents identification information that is uniquely applied each time supplying of electric power is performed. When the user ID and the supply ID are stored in an associated manner in the registration list table, it is indicated that the user identified by the user ID represents the user having undergone participation registration for supplying of electric power identified by the supply ID.

The participation information represents information that indicates whether or not the user having undergone participation registration has actually participated in supplying of electric power. It is possible that the participation information has, as an example, one of three types of values corresponding to an un-participated state, a participated state, and a non-participated state.

The un-participated state indicates that supplying of electric power has not yet started. The participated state indicates that participation in supplying of electric power has been performed. The non-participated state indicates that participation in supplying of electric power has been canceled.

A list of the users each in the non-participated state represents a list of the users who have undergone participation registration, but have not participated in supplying of electric power.

The supply table represents information that indicates, in a state of a table, information related to each supplying. The supply table stores, for each supplying of electric power, a supply ID and information related to the supplying of electric power in an associated manner.

The communication interface 150 represents an interface that the control server 100 uses to establish communication via the network NW, for example.

The bus 160 includes, for example, a control bus, an address bus, and a data bus to transmit signals to be exchanged among the components in the control server 100.

The terminal apparatus 200 represents an apparatus that each of the users of the V2G system 1 uses. The terminal apparatus 200 is, for example, a personal computer (PC), a tablet terminal, or a smart phone. Otherwise, the terminal apparatus 200 is a control terminal for a smart house. Otherwise, the terminal apparatus 200 may be an on-vehicle apparatus in the vehicle 300. The on-vehicle apparatus may be an on-vehicle apparatus identical to an on-vehicle apparatus 310 or different from the on-vehicle apparatus 310. Otherwise, the electric power supply apparatus 400 described later may include the terminal apparatus 200. The terminal apparatus 200 includes, as an example, a processor 210, a ROM 220, a RAM 230, an auxiliary storage 240, a communication interface 250, an input device 260, and a display device 270. Then, a bus 280 couples these components, for example.

The processor 210 serves as a central part of a computer that performs processing such as calculation and control necessary for operating the terminal apparatus 200, and that performs various types of calculation and processing, for example. The processor 210 is, for example, a CPU, an MPU, an SoC, a DSP, a GPU, an ASIC, a PLD, or an FPGA. Otherwise, the processor 210 is a combination of a plurality of those described above. Furthermore, the processor 210 may be a combination of those described above and a hardware accelerator, for example. The processor 210 controls the components to achieve various types of functions of the terminal apparatus 200 based on programs, such as firmware, system software, and application software, stored in the ROM 220 or the auxiliary storage 240, for example. Furthermore, the processor 210 executes processing described later based on the programs. Note that some or all of the programs may be incorporated into a circuit in the processor 210.

The ROM 220 and the RAM 230 represent main storage devices for the computer that includes the processor 210 as a core component. The ROM 220 represents a non-volatile memory mainly used to read data. The ROM 220 stores the firmware, for example, among the programs described above. Furthermore, the ROM 220 further stores, for example, data that the processor 210 uses for performing various types of processing.

The RAM 230 represents a memory used to read and write data. The RAM 230 is utilized, for example, as a work area for storing data that the processor 210 uses on a temporal basis for performing various types of processing. The RAM 230 typically represents a volatile memory.

The auxiliary storage 240 represents an auxiliary storage for the computer that includes the processor 210 as the core component. The auxiliary storage 240 is, for example, an EEPROM, an HDD, or a flash memory. The auxiliary storage 240 stores, for example, the system software and the application software, among the programs described above. Furthermore, the auxiliary storage 240 further stores, for example, data that the processor 210 uses for performing various types of processing, data generated through the processing in the processor 210, and various types of set values.

The communication interface 250 represents an interface that the terminal apparatus 200 uses to establish communication via the network NW, for example.

The input device 260 receives an operation performed by an operator of the terminal apparatus 200. The input device 260 includes, for example, a keyboard, a keypad, a touch pad, a mouse, or a controller. Furthermore, the input device 260 may be a sound input device.

The display device 270 displays a screen for notifying various types of information to the operator of the terminal apparatus 200, for example. The display device 270 is a display such as a liquid crystal display or an organic electro-luminescence (EL) display. Furthermore, it is possible to use a touch panel as the input device 260 and the display device 270. That is, it is possible to use a display panel that the touch panel includes as the display device 270 and a pointing device that the touch panel includes and that receives a touch input as the input device 260.

The bus 280 includes, for example, a control bus, an address bus, and a data bus to transmit signals to be exchanged among the components in the terminal apparatus 200.

The vehicle 300 represents an electric vehicle that is able to output electric power to one that is present outside the vehicle 300. The vehicle 300 is, for example, an electric vehicle (EV) or a plug-in hybrid electric vehicle (PHEV). Otherwise, the vehicle 300 may be a fuel cell vehicle (FCV). Furthermore, the vehicle 300 may be an electric vehicle of another type. The vehicle 300 includes, as an example, the on-vehicle apparatus 310 and an electric power source 320.

The on-vehicle apparatus 310 controls an output of the electric power source 320. The on-vehicle apparatus 310 represents, for example, an electronic control unit (ECU) in the vehicle 300.

The electric power source 320 represents an electric power source that supplies electric power to the components in the vehicle 300. The components include, for example, a motor. The motor generates a driving force that allows the vehicle 300 to move. Furthermore, the electric power source 320 is able to output electric power to one that is present outside the vehicle 300.

When the vehicle 300 is an EV or a PHEV, the electric power source 320 represents a secondary battery. When the vehicle 300 is an FCV, the electric power source 320 represents a fuel cell. Furthermore, the electric power source 320 may be an electric power source other than a secondary battery and a fuel cell. Example electric power sources other than a secondary battery and a fuel cell include an electric power generator and a supercapacitor. Note that the vehicle 300 may include a plurality of types of the electric power sources 320.

The electric power supply apparatus 400 receives an input of electric power that the electric power source 320 in the vehicle 300 outputs. The electric power supply apparatus 400 supplies the electric power to the electric power system 500. The electric power supply apparatus 400 may be able to supply the electric power to a smart home. The electric power supply apparatus 400 is installed in, for example, a vehicle-parking space for a building such as a single house. Furthermore, it is not limited to a single house, but the electric power supply apparatus 400 may be installed in a vehicle-parking space for a building, a factory, or another facility.

Furthermore, the electric power supply apparatus 400 may be able to electrically charge the electric power source 320. The electric power supply apparatus 400 in this case represents, for example, electric vehicle supply equipment (EVSE).

The electric power system 500 represents a system that supplies electricity. The electric power system 500 includes, for example, generation of electricity, transformation of electricity, transmission of electricity, and distribution of electricity. Since the electric power system is known, its detailed description is omitted.

Figure 2:
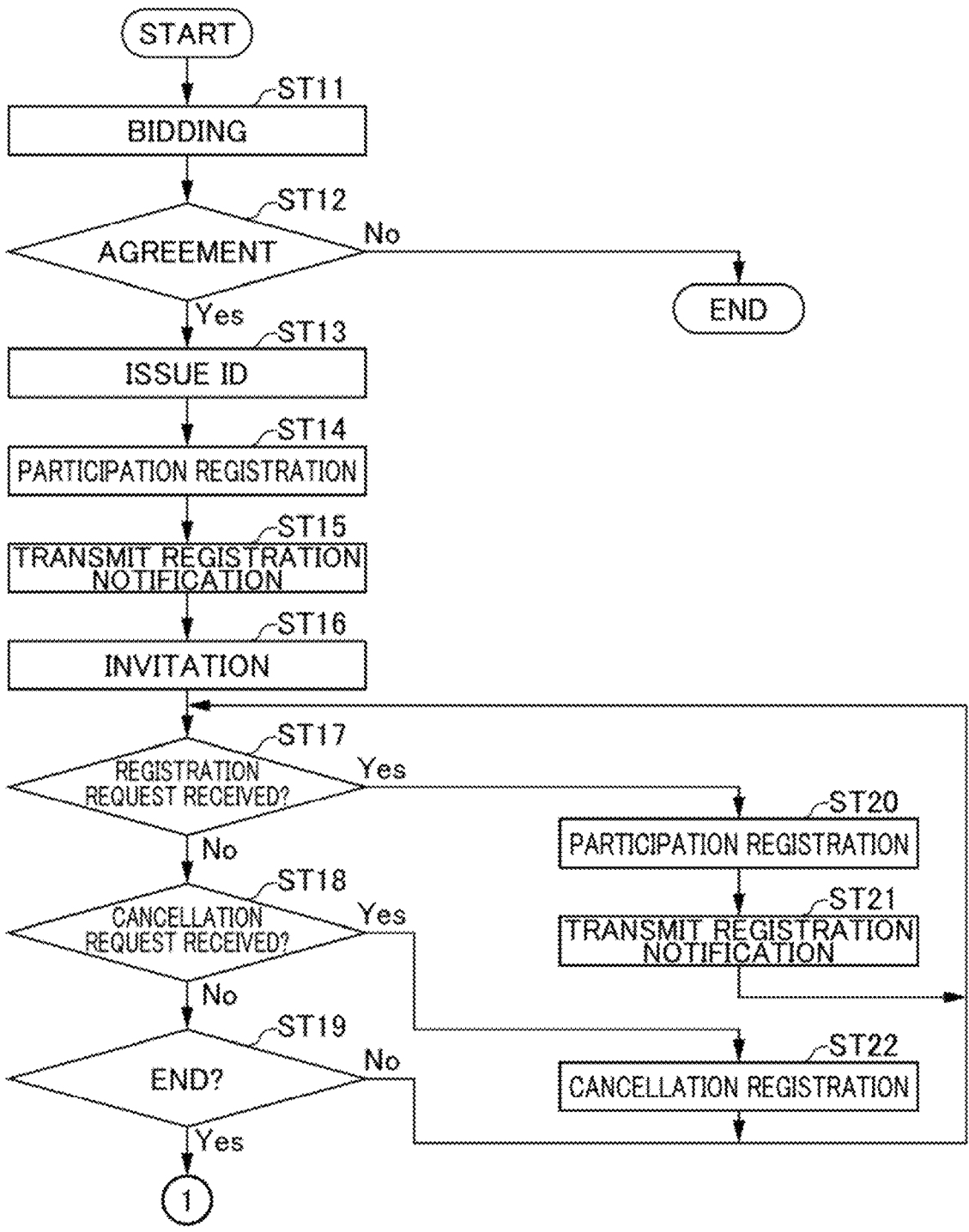
FIG. 2 is a flowchart illustrating an example of processing performed by a processor in a control server illustrated in FIG. 1.
Figure 3:
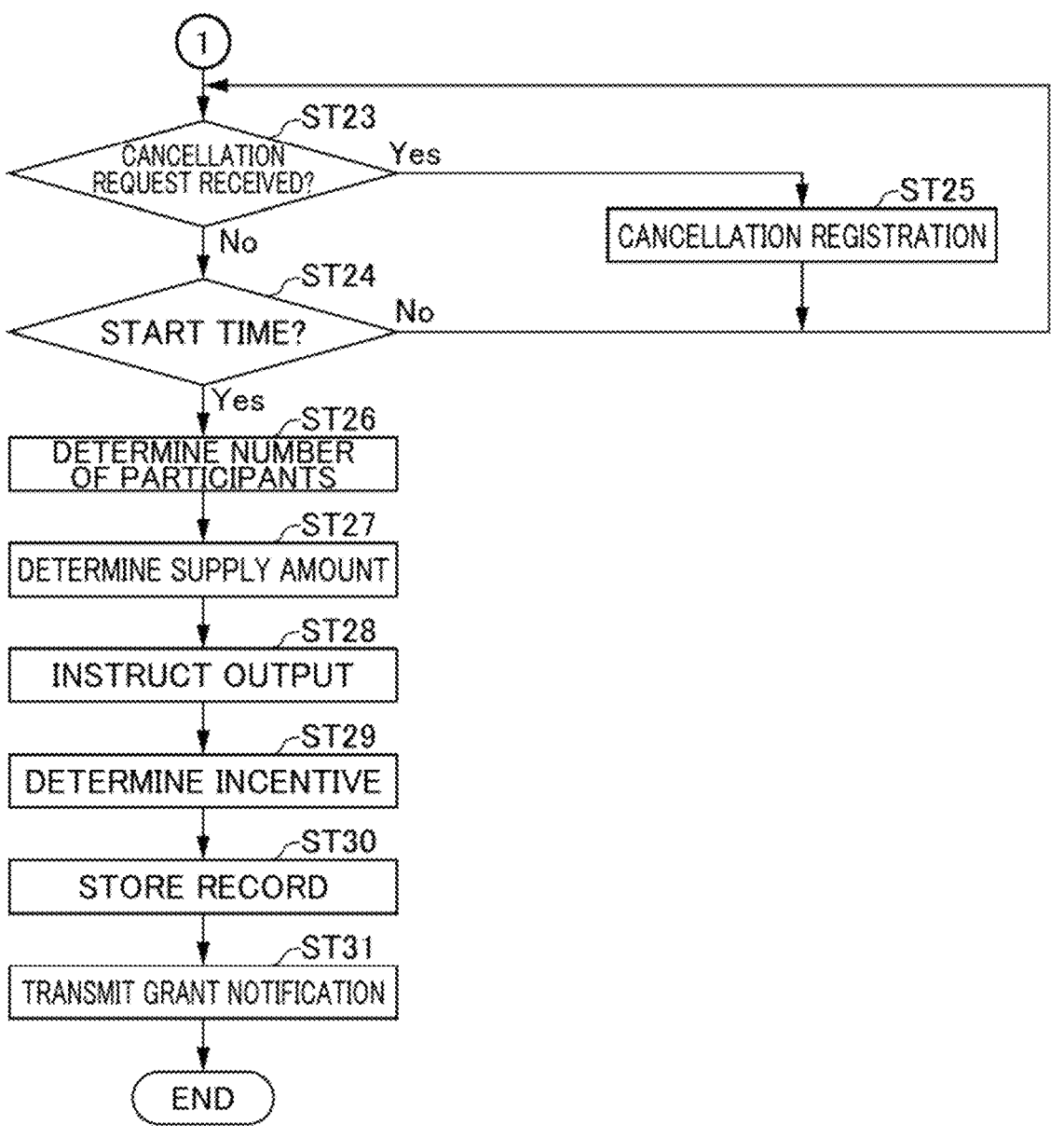
FIG. 3 is a flowchart illustrating the example of the processing performed by the processor in the control server illustrated in FIG. 1.
Figure 4:
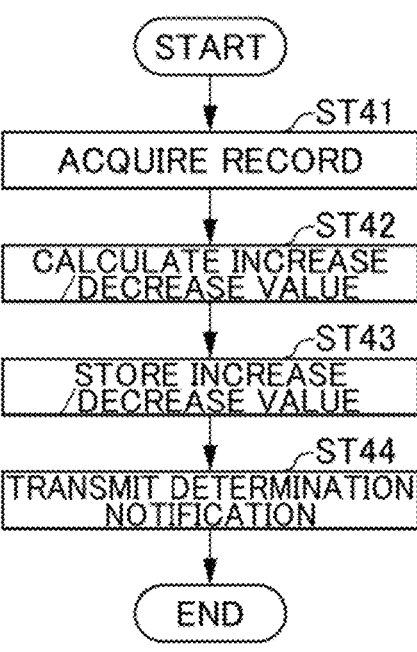
FIG. 4 is a flowchart illustrating the example of the processing performed by the processor in the control server illustrated in FIG. 1.
Figure 5:
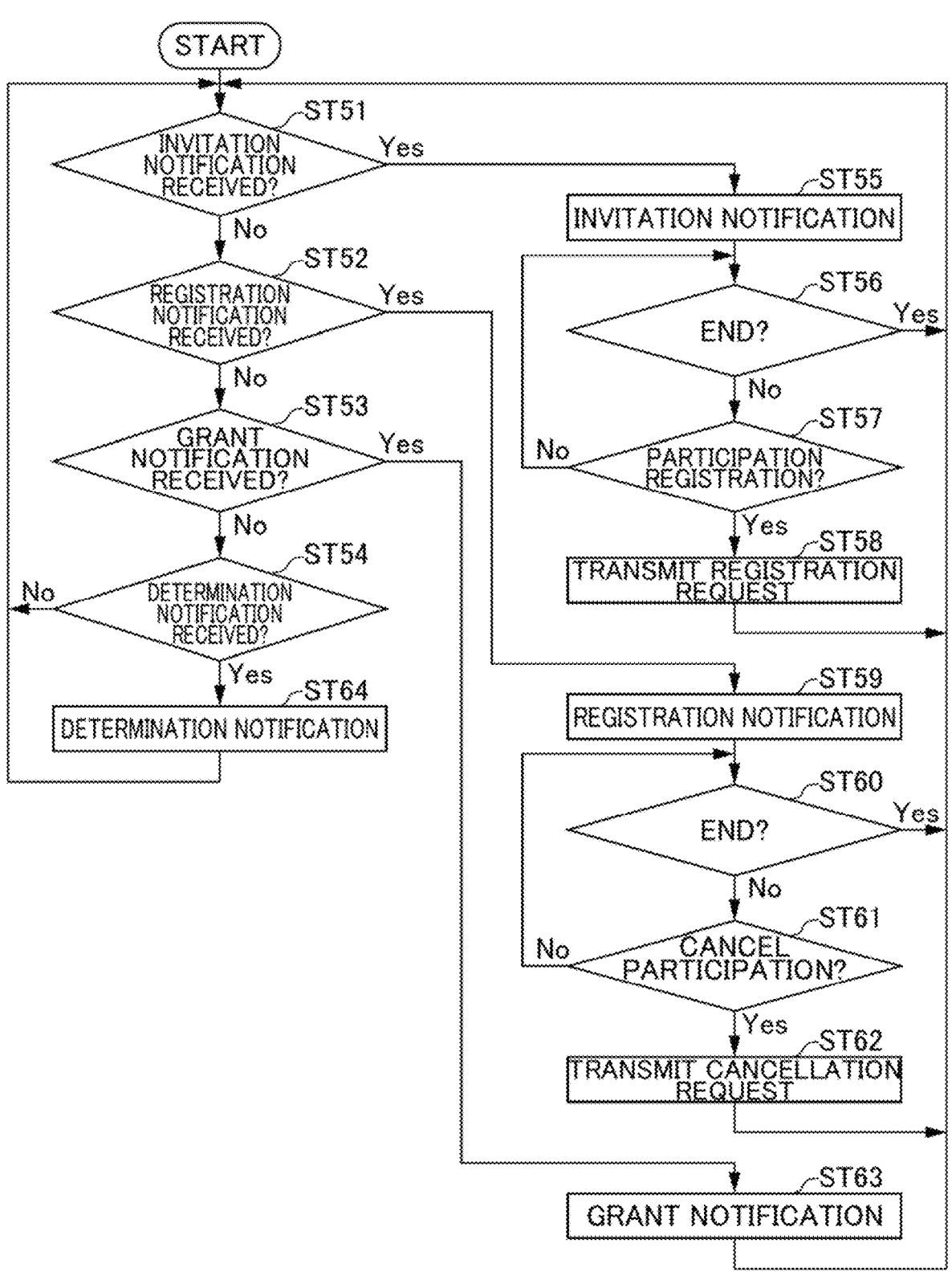
FIG. 5 is a flowchart illustrating an example of processing performed by a processor in a terminal apparatus illustrated in FIG. 1.

Operation of the V2G system 1 according to the embodiment will now be described herein based on FIGS. 2 to 5, for example. Note that the content of the processing in the below operational description is a mere example. It is possible to appropriately utilize various types of processing that makes it possible to acquire similar results. FIGS. 2 to 4 are flowcharts illustrating an example of processing performed by the processor 110 in the control server 100. The processor 110 executes the processing illustrated in FIGS. 2 to 4 based on the programs stored in the ROM 120 or the auxiliary storage 140, for example. FIG. 5 is a flowchart illustrating an example of processing performed by the processor 210 in the terminal apparatus 200. The processor 210 executes the processing illustrated in FIG. 5 based on the programs stored in the ROM 220 or the auxiliary storage 240, for example.

The processor 110 in the control server 100 starts the processing illustrated in FIG. 2 when bidding is to be performed in an electric power market, for example.

At step ST11 illustrated in FIG. 2, the processor 110 in the control server 100 performs bidding for selling electric power in the electric power market. For the electric power to be sold, the processor 110 performs the bidding by specifying an electric energy to be supplied (hereinafter referred to as a "total supply energy".) and a period of time during which the electric power is to be supplied (hereinafter referred to as a "period of time of supply".).

At step ST12, the processor 110 determines whether or not an agreement has been concluded for the bidding performed at step ST11. When no agreement has been concluded, the processor 110 determines No at step ST12, and ends the processing illustrated in FIG. 2. On the other hand, when an agreement has been concluded, the processor 110 determines Yes at step ST12, and proceeds to step ST13. Note that the total supply energy and the period of time of supply are determined based on content of the bidding and a result of the agreement.

At step ST13, the processor 110 issues a supply ID for the supplying of electric power for which the agreement has been concluded. The supply ID, which represents identification information that is unique to each supplying of electric power, as described above, also represents identification information that is unique to each agreement. Furthermore, the processor 110 stores, in the supply table, the supply ID and the total supply energy and the period of time of supply in an associated manner.

At step ST14, the processor 110 refers to the participation setting information of each user, and performs participation registration for the user to which it has been set that participation registration is to be performed automatically. The processor 110 adds, in the registration list table, for example, the user ID of the user for which participation registration is to be performed and the supply ID and the participation information in an associated manner to perform participation registration for the user. The supply ID represents the supply ID issued at step ST13. The value of the participation information is one corresponding to the unparticipated state.

At step ST15, the processor 110 generates a registration notification. The registration notification represents information that indicates that participation registration has been performed. The registration notification includes information that indicates the period of time of supply. After the registration notification has been generated, the processor 110 instructs the communication interface 150 to transmit the registration notification to the terminal apparatus 200 of the user having undergone participation registration at step ST14. As this instruction for transmission has been received, the communication interface 150 transmits the registration notification to the terminal apparatus 200. The registration notification that has been transmitted is received by the communication interface 250 in the terminal apparatus 200.

At step ST16, the processor 110 performs invitation for participation registration. To this end, the processor 110 generates an invitation notification. The invitation notification represents information that notifies that invitation for participation registration is performed. The invitation notification includes information that indicates the period of time of supply. After the invitation notification has been generated, the processor 110 instructs the communication interface 150 to transmit the invitation notification to the terminal apparatus 200. As the instruction for transmission has been received, the communication interface 150 transmits the invitation notification to the terminal apparatus 200. The invitation notification that has been transmitted is received by the communication interface 250 in the terminal apparatus 200.

On the other hand, at step ST51 illustrated in FIG. 5, the processor 210 in the terminal apparatus 200 determines whether or not the communication interface 250 has received an invitation notification. When no invitation notification has been received, the processor 210 determines No at step ST51, and proceeds to step ST52.

At step ST52, the processor 210 determines whether or not the communication interface 250 has received a registration notification. When no registration notification has been received, the processor 210 determines No at step ST52, and proceeds to step ST53.

At step ST53, the processor 210 determines whether or not the communication interface 250 has received a grant notification. When no grant notification has been received, the processor 210 determines No at step ST53, and proceeds to step ST54.

At step ST54, the processor 210 determines whether or not the communication interface 250 has received a determination notification. When no determination notification has been received, the processor 210 determines No at step ST54, and returns to step ST51. Therefore, the processor 210 stays in a stand-by state where steps ST51 to ST54 are repeated until an invitation notification, a registration notification, a grant notification, or a determination notification is received.

When an invitation notification has been received while in the stand-by state where steps ST51 to ST54 are repeated, the processor 210 determines Yes at step ST51, and proceeds to step ST55.

At step ST55, the processor 210 notifies the user that there has been invitation for participation registration. To this end, the processor 210 generates, for example, an image corresponding to an invitation screen. Then, the processor 210 instructs the display device 270 to display the generated image. As the instruction for display has been received, the display device 270 displays the invitation screen.

The invitation screen represents a screen that notifies the operator of the terminal apparatus 200 that there is invitation for participation registration. The invitation screen includes, as an example, a participation button and an end button. The participation button represents a button for performing an operation when participation registration is to be performed. When the operator of the terminal apparatus 200 registers for participation, the operator operates the participation button. The end button represents a button to be operated when displaying of the invitation screen is to be ended. When the operator of the terminal apparatus 200 does not register participation or wishes to close the invitation screen, for example, the operator operates the end button.

At step ST56, the processor 210 determines whether or not displaying of the invitation screen is to be ended. When the end button has been operated, for example, the processor 210 determines that displaying of the invitation screen is to be ended. Furthermore, after a predetermined period of time has passed from displaying of the invitation screen, the processor 210 determines that displaying of the invitation screen is to be ended. When it is not determined that displaying of the invitation screen is to be ended, the processor 210 determines No at step ST56, and proceeds to step ST57.

At step ST57, the processor 210 determines whether or not participation registration is to be performed. When there is an input instructing that participation registration is to be performed, such as when the participation button is operated, the processor 210 determines that participation registration is to be performed. When it is not determined that participation registration is to be performed, the processor 210 determines No at step ST57, and returns to step ST56. Therefore, the processor 210 stays in a stand-by state where steps ST56 and ST57 are repeated until it is determined that displaying of the invitation screen is to be ended or it is determined that participation registration is to be performed.

When it is determined that displaying of the invitation screen is to be ended while in the stand-by state where steps ST56 and ST57 are repeated, the processor 210 determines Yes at step ST56, and returns to step ST51. At this time, the processor 210 controls the display device 270 to end displaying of the invitation screen.

When it is determined that participation registration is to be performed while in the stand-by state where steps ST56 and ST57 are repeated, the processor 210 determines Yes at step ST57, and proceeds to step ST58.

At step ST58, the processor 210 generates a registration request. The registration request includes, as an example, the user ID. The user ID represents the user ID of the user who has transmitted the registration request. After the registration request has been generated, the processor 210 instructs the communication interface 250 to transmit the registration request to the control server 100. As the instruction for transmission has been received, the communication interface 250 transmits the registration request to the control server 100. The registration request that has been transmitted is received by the communication interface 150 in the control server 100.

On the other hand, at step ST17 illustrated in FIG. 2, the processor 110 in the control server 100 determines whether or not the communication interface 150 has received a registration request. When no registration request has been received, the processor 110 determines No at step ST17, and proceeds to step ST18.

At step ST18, the processor 110 determines whether or not the communication interface 150 has received a cancellation request. When no cancellation request has been received, the processor 110 determines No at step ST18, and proceeds to step ST19.

At step ST19, the processor 110 determines whether or not invitation for participation registration is to be ended. When a length of a period of time from current time to start time for supplying of electric power is equal to or longer than a predetermined period of time, for example, the processor 110 determines that invitation for participation registration is to be ended. Furthermore, when a number of the users having undergone participation registration has reached an upper limit that is set beforehand, the processor 110 may also determine that invitation for participation registration is to be ended. When it is not determined that invitation for participation registration is to be ended, the processor 110 determines No at step ST19, and returns to step ST17. Therefore, the processor 110 stays in a stand-by state where steps ST17 to ST19 are repeated until a registration request or a cancellation request is received or it is determined that invitation for participation registration is to be ended.

As a registration request has been received while in the stand-by state where steps ST17 to ST19 are repeated, the processor 110 determines Yes at step ST17, and proceeds to step ST20.

At step ST20, the processor 110 performs participation registration for the user identified by the user ID included in the registration request received at step ST17, similar to step ST14.

At step ST21, the processor 110 generates a registration notification. After the registration notification has been generated, the processor 110 instructs the communication interface 150 to transmit the registration notification to the terminal apparatus 200. The terminal apparatus 200 represents the terminal apparatus 200 from which the registration request has been transmitted. As the instruction for transmission has been received, the communication interface 150 transmits the registration notification to the terminal apparatus 200. The registration notification that has been transmitted is received by the communication interface 250 in the terminal apparatus 200. After step ST21 in the processing, the processor 110 returns to step ST17.

On the other hand, when a registration notification has been received while in the stand-by state where steps ST51 to ST54 illustrated in FIG. 5 are repeated, the processor 210 in the terminal apparatus 200 determines Yes at step ST52, and proceeds to step ST59.

At step ST59, the processor 210 generates an image corresponding to a registration screen. Then, the processor 210 instructs the display device 270 to display the generated image. As the instruction for display has been received, the display device 270 displays the registration screen.

The registration screen represents a screen that notifies the operator of the terminal apparatus 200 that participation registration has been completed. The registration screen includes, as an example, a cancellation button and an end button. The cancellation button represents a button to be operated when participation in supplying of electric power is to be canceled. When the operator of the terminal apparatus 200 cancels participation registration, the operator operates the cancellation button. The end button represents a button to be operated when displaying of the invitation screen is to be ended.

At step ST60, the processor 210 determines whether or not displaying of the registration screen is to be ended. When the end button has been operated, for example, the processor 210 determines that displaying of the registration screen is to be ended. When displaying of the registration screen is not to be ended, the processor 210 determines No at step ST60, and proceeds to step ST61.

At step ST61, the processor 210 determines whether or not participation in supplying of electric power is to be canceled. For example, when there is an input instructing that participation in supplying of electric power is to be canceled, such as when the cancellation button is operated, the processor 210 determines that participation in supplying of electric power is to be canceled. When it is not determined that participation in supplying of electric power is to be canceled, the processor 210 determines No at step ST61, and returns to step ST60. Therefore, the processor 210 stays in a stand-by state where steps ST60 and ST61 are repeated until it is determined that displaying of the registration screen is to be ended or it is determined that participation in supplying of electric power is to be canceled.

When it is determined that displaying of the registration screen is to be ended while in the stand-by state where steps ST60 and ST61 are repeated, the processor 210 determines Yes at step ST60, and returns to step ST51. At this time, the processor 210 controls the display device 270 to end displaying of the registration screen.

When it is determined that participation in supplying of electric power is to be canceled while in the stand-by state where steps ST60 and ST61 are repeated, the processor 210 determines Yes at step ST61, and proceeds to step ST62.

At step ST62, the processor 210 generates a cancellation request. The cancellation request represents information that indicates that participation in supplying of electric power is to be canceled. The cancellation request includes, as an example, the user ID. The user ID represents the user ID of the user who has transmitted the cancellation request. After the cancellation request has been generated, the processor 210 instructs the communication interface 250 to transmit the cancellation request to the control server 100. As the instruction for transmission has been received, the communication interface 250 transmits the cancellation request to the control server 100. The cancellation request that has been transmitted is received by the communication interface 150 in the control server 100. After step ST62 in the processing, the processor 210 returns to step ST51.

On the other hand, when a cancellation request has been received while in the stand-by state where steps ST17 to ST19 illustrated in FIG. 2 are repeated, the processor 110 in the control server 100 determines Yes at step ST18, and proceeds to step ST22.

When invitation for participation registration is to be ended while in the stand-by state where steps ST17 to ST19 are repeated, the processor 110 determines Yes at step ST19, and proceeds to step ST22.

At step ST22, the processor 110 stores that the user identified by the user ID included in the registration request received at step ST17 has canceled participation in supplying of electric power. To this end, the processor 110 sets, for example, the value of the participation information with which the user ID and the supply ID issued at step ST13 are associated to one corresponding to the non-participated state. After step ST22 in the processing, the processor 110 returns to step ST17.

When it is determined that invitation for participation registration is to be ended while in the stand-by state where steps ST17 to ST19 are repeated, the processor 110 determines Yes at step ST19, and proceeds to step ST23 illustrated in FIG. 3.

At step ST23, the processor 110 determines whether or not the communication interface 150 has received a cancellation request. When no cancellation request has been received, the processor 110 determines No at step ST23, and proceeds to step ST24.

At step ST24, the processor 110 determines whether or not the start time for supplying of electric power has arrived. When the start time for supplying of electric power has not yet arrived, the processor 110 determines No at step ST24, and returns to step ST23. Therefore, the processor 110 stays in a stand-by state where steps ST23 and ST24 are repeated until the start time for supplying of electric power has arrived, during which a cancellation request is to be received.

When a cancellation request has been received while in the stand-by state where steps ST23 and ST24 are repeated, the processor 110 determines Yes at step ST23, and proceeds to step ST25.

At step ST25, the processor 110 stores that the user identified by the user ID included in the registration request that has been received at step ST23 has canceled participation in supplying of electric power, similar to step ST22. After step ST25 in the processing, the processor 110 returns to step ST23.

When the start time for supplying of electric power has arrived while in the stand-by state where steps ST23 and ST24 are repeated, the processor 110 determines Yes at step ST24, and proceeds to step ST26.

At step ST26, the processor 110 determines the users actually participating in supplying of electric power (hereinafter referred to as "actual participation users".) and a number of the actual participation users. The processor 110 executes processing from (A1) to (A5) described below, for example, to determine the number of the users.

(A1) The processor 110 refers to the registration list table to acquire all the user IDs for which the value of the associated participation information is one corresponding to the un-participated state, among the user IDs associated with the supply ID issued at step ST13.

(A2) The processor 110 refers to the user DB to acquire the output apparatus information from the user information associated with each of the user IDs acquired in (A1).

(A3) The processor 110 confirms, for each of the vehicle 300 and the electric power supply apparatus 400 that are identified by the output apparatus information acquired in (A2), whether or not it is possible to supply electric power that the electric power source 320 outputs to the electric power system 500. The processor 110 makes, for example, an inquiry to the vehicle 300 and the electric power supply apparatus 400 via the communication interface 150 and the network NW to confirm whether or not supplying of electric power to the electric power system 500 is possible. At least one of the vehicle 300 or the electric power supply apparatus 400 responds to the inquiry to confirm whether or not supplying of electric power to the electric power system 500 is possible. At least one of the vehicle 300 or the electric power supply apparatus 400 performs, for example, an attempt of actual supplying of electric power from the electric power source 320 to the electric power system 500. Then, when the attempt of supplying of electric power is successful, it is determined that at least one of the vehicle 300 or the electric power supply apparatus 400 is able to perform supplying of electric power to the electric power system 500. Note that, when the vehicle 300 is not coupled to the electric power supply apparatus 400, it may be determined that at least one of the vehicle 300 or the electric power supply apparatus 400 is not possible to perform supplying of electric power. Furthermore, when an electric energy that the electric power source 320 is able to output is equal to or less than a predetermined electric energy, it may be determined that at least one of the vehicle 300 or the electric power supply apparatus 400 is not possible to perform supplying of electric power to the electric power system 500. A result of the determination of whether or not at least one of the vehicle 300 or the electric power supply apparatus 400 is possible to perform supplying of electric power to the electric power system 500 is transmitted to the control server 100. The result of the determination is received by the communication interface 150. When the result of the determination, which the communication interface 150 has received, indicates that supplying of electric power to the electric power system 500 is possible, the processor 110 determines that it is possible to supply electric power that the electric power source 320 outputs to the electric power system 500.

(A4) The processor 110 determines actual participation users. The actual participation user represents the user who uses the vehicle 300 and the electric power supply apparatus 400 for which it has been determined in (A3) that it is possible to supply electric power that the electric power source 320 outputs to the electric power system 500. Furthermore, the processor 110 updates the registration list table. That is, the processor 110 sets, for the user who is not an actual participation user (hereinafter referred to as a "non-participation user".), among the users identified by the user IDs acquired in (A1), the value of the participation information to one corresponding to the non-participated state.

(A5) The processor 110 counts a number of the determined actual participation users to determine the number of the actual participation users.

The number of actual participation users represents an example of a number of participants representing a number of electric power sources that are able to actually participate in supplying of electric power to an electric system. Therefore, the processor 110 performs at least one of step ST14 or step ST20, and step ST26, and, as necessary, at least one of step ST22 or step ST25 in the processing illustrated in FIGS. 2 and 3 to function as an example of a determiner that determines a number of participants representing a number of electric power sources that are able to actually participate in supplying of electric power to an electric system.

At step ST27, the processor 110 uses a formula described below, for example, to calculate and determine an supplied electric energy per actual participation user (hereinafter referred to as a "user supply energy".).

$$\text{(User supply energy)} = \text{(Total supply energy)}/ \quad (1)$$

$$\text{(Number of actual participation users)}$$

Furthermore, the processor 110 uses a formula described below, for example, to calculate and determine electric power per actual participation user (hereinafter referred to as "user electric power"). The user electric power represents electric power for supplying a user supply energy for a period of time of supply.

$$\text{(User electric power)} = \quad (2)$$

$$\text{(User supply energy)}/\text{(Period of time of supply)}$$

At step ST28, the processor 110 provides an instruction for supplying the user supply energy to each of the actual participation users. That is, the processor 110 performs control to cause, for each of the actual participation users, the vehicle 300 and the electric power supply apparatus 400, which are identified by the output apparatus information acquired in (A2), to start supplying of electric power, via the communication interface 150 and the network NW. The processor 110 controls, for example, the vehicle 300 and the electric power supply apparatus 400 to output the user electric power for the period of time of supply. Thereby, each of the electric power sources 320 outputs the user electric power to the electric power system 500 for the period of time of supply to supply the user supply energy to the electric power system 500.

It is assumed that, as an example, the total supply energy be 90 kWh, the period of time of supply be two hours, and the number of actual participation users be nine. In this case, the user supply energy is 10 kWh, according to 90 [kWh]/9=10 [kWh]. Furthermore, the user electric power is 5 kW, according to 10 [kWh]/2 [hours]=5 [KW]. That is, as each of the nine users outputs electric power of 5 kW to the electric power system 500 for two hours, a total electric energy of 90 kWh is to be supplied to the electric power system 500.

As described above, the processor 110 performs steps ST27 and ST28 in the processing to function as an example of an output controller that causes each of electric power sources that are able to actually participate in supplying to output, to an electric system, an electric energy determined by dividing an a predetermined electric energy by the number of participants.

At step ST29, the processor 110 determines an amount of an incentive to be granted to each of the actual participation users (hereinafter referred to as a "granted amount".). It is possible to acquire a granted amount by using a base amount and an increase-or-decrease value. The processor 110 uses a formula described below, for example, to calculate a base amount.

$$\text{(Base amount)} = \text{(Total incentive)}/ \quad (3)$$

$$\text{(Number of actual participation users)}$$

Note herein that a total incentive is determined based on, for example, at least one of an agreed amount of money or a total supply energy. The processor 110 uses one of formulas described below, for example, to calculate a total incentive.

$$\text{(Total incentive)} = \text{(Coefficient C1 that is set beforehand)} \times \tag{4}$$
$$\text{(Agreed amount of money)}$$

$$\text{(Total incentive)} = \text{(Coefficient C2 that is set beforehand)} \times \tag{5}$$
$$\text{(Total supply energy)}$$

Furthermore, the processor 110 uses a formula described below, for example, to calculate a granted amount for each of the actual participation users. Note that the processor 110 refers to the user DB 141 to acquire the increase-or-decrease value for each of the actual participation users.

$$\text{(Granted amount)} = \tag{6}$$
$$\text{(Base amount)} \times \left(10 + \text{Increase-or-decrease value}\right) \, [\%]$$

Furthermore, the processor 110 updates, for the user DB, the incentive information for the actual participation users. That is, the processor 110 adds, for each of the actual participation users, the granted amount that has been calculated to the amount of the incentive that the incentive information indicates.

The processor 110 transfers the incentive granted to each of the users to an account of the each of the users in a real-time manner or on a later day collectively, for example. Otherwise, the processor 110 may use another method to grant at least one of currency, electronic money, or points to each of the users.

As described above, the processor 110 performs step ST29 in the processing to function as an example of a granter that grants an incentive to a user who uses an electric power source that actually participates in supplying.

At step ST30, the processor 110 updates the registration list table. That is, the processor 110 sets, for each of the actual participation users, among the users identified by the user IDs acquired in (A1), the value of the participation information to one corresponding to the participated state.

Furthermore, the processor 110 updates the record information in the user DB. That is, the processor 110 acquires, for each of the users, the supply ID and the participation information that are associated with the user ID from the registration list table. Then, the processor 110 associates, with each other, and adds the supply ID and the participation information that have been acquired to the record information in the user information associated with the user ID.

At step ST31, the processor 110 generates a grant notification. The grant notification represents information that notifies a granted amount of an incentive. The grant notification includes a granted amount for a user to which a grant notification has been transmitted. However, a granted amount for a user other than an actual participation user is 0. After the grant notification has been generated, the processor 110 instructs the communication interface 150 to transmit the grant notification to each of the terminal apparatuses 200 of the users having undergone participation registration at steps ST14 and ST20. As the instruction for transmission has been received, the communication interface 150 transmits the grant notification to each of the terminal apparatuses 200. The grant notification that has been transmitted is received by the communication interface 250 in each of the terminal apparatuses 200. After step ST31 in the processing, the processor 110 ends the processing illustrated in FIG. 3.

On the other hand, when a grant notification has been received while in the stand-by state where steps ST51 to ST54 illustrated in FIG. 5 are repeated, the processor 210 in the terminal apparatus 200 determines Yes at step ST53, and proceeds to step ST63.

At step ST63, the processor 210 generates an image corresponding to a grant screen. Then, the processor 210 instructs the display device 270 to display the generated image. As the instruction for display has been received, the display device 270 displays the grant screen. After step ST63 in the processing, the processor 210 returns to step ST51.

The grant screen represents a screen that notifies a granted amount to the operator of the terminal apparatus 200. The grant screen includes, as an example, an image indicating the granted amount included in the grant notification received at step ST53.

A method of determining an increase-or-decrease value will now be described herein with reference to FIG. 4. The processor 110 in the control server 100 executes processing illustrated in FIG. 4 at a predetermined timing to determine an increase-or-decrease value for each of the users. The user who is a target to which an increase-or-decrease value is to be calculated will be hereinafter referred to as a "target user".

At step ST41 illustrated in FIG. 4, the processor 110 in the control server 100 refers to the user DB 141 to acquire the record information in the user information associated with the user ID of the target user.

At step ST42, the processor 110 calculates an increase-or-decrease value. The increase-or-decrease value represents a value that increases as a participation ratio increases. It is possible to acquire a participation ratio during a certain period of time with a formula described below.

$$\text{(Participation ratio)} = \text{(Number of times of actual participation)} / \tag{7}$$
$$\text{(Number of times of particiation registration)}$$

Note herein that the number of times of actual participation represents a number of times the user becomes the actual participation user during the period of time. Furthermore, the number of times of participation registration represents a number of times the user has undergone participation registration during the period of time. That is, the participation ratio represents a ratio of those which have actually participated in supplying of electric power to those which have undergone participation registration.

The increase-or-decrease value includes, as an example, a monthly increase-or-decrease value and a yearly increase-or-decrease value. That is, it is possible to represent an increase-or-decrease value with a formula described below, for example.

$$\text{(Increase-or-decrease value)} = \tag{8}$$
$$\text{(Monthly increase-or-decrease value)} +$$
$$\text{(Yearly increase-or-decrease value)}$$

The monthly increase-or-decrease value represents a value that increases as a monthly participation ratio increases. Note herein that monthly means a latest month or a previous month. Note that a previous month means a month that is previous to a month including a current date. It is not limited that a month starts from a first day on a calendar basis. A month may start from another day. As an example, a month may range from a 15th day to a 14th day of a next month, for example. As an example, when a monthly participation ratio is 60%, a monthly increase-or-decrease value is determined to −10%. When a monthly participation ratio is 70%, a monthly increase-or-decrease value is determined to −5%. When a monthly participation ratio is 80%, a monthly increase-or-decrease value is determined to 0%. When a monthly participation ratio is 100%, a monthly increase-or-decrease value is determined to 10%. A monthly increase-or-decrease value may be one acquired with a formula. Note that one month is an example of a first predetermined period of time.

The yearly increase-or-decrease value represents a value that increases as a yearly participation ratio increases. Note herein that yearly means a latest year or a previous year. Note that a previous year means a year that is previous to a year including a current date. It is not limited that a year starts from a first day of January. A year may start from another day. As an example, a year may range from a second day of April to a first day of April of a next year. As an example, when a yearly participation ratio is 50%, a yearly increase-or-decrease value is determined to −1%. When a yearly participation ratio is 60%, a yearly increase-or-decrease value is determined to 0%. When a yearly participation ratio is 90%, a yearly increase-or-decrease value is determined to 3%. A yearly increase-or-decrease value may be acquired with a formula. Note that one year is an example of a second predetermined period of time that is longer than the first predetermined period of time.

At step ST43, the processor 110 updates the user DB and stores the increase-or-decrease value, the monthly increase-or-decrease value, and the yearly increase-or-decrease value that are determined at step ST42. That is, the processor 110 rewrites the increase-or-decrease information in the user information associated with the user ID of the target user, and stores the increase-or-decrease value, the monthly increase-or-decrease value, and the yearly increase-or-decrease value in the increase-or-decrease information.

At step ST44, the processor 110 generates a determination notification. The determination notification represents information that notifies the increase-or-decrease value determined at step ST42. The determination notification includes, as an example, the increase-or-decrease value, the monthly increase-or-decrease value, and the yearly increase-or-decrease value that are determined at step ST42, and the monthly participation ratio and the yearly participation ratio. After the determination notification has been generated, the processor 110 instructs the communication interface 150 to transmit the determination notification to the terminal apparatus 200 that the target user uses. As the instruction for transmission has been received, the communication interface 150 transmits the determination notification to the terminal apparatus 200. The determination notification that has been transmitted is received by the communication interface 250 in the terminal apparatus 200.

On the other hand, when a determination notification has been received while in the stand-by state where steps ST51 to ST54 illustrated in FIG. 5 are repeated, the processor 210 in the terminal apparatus 200 determines Yes at step ST54, and proceeds to step ST64.

At step ST64, the processor 210 generates an image corresponding to a determination screen. Then, the processor 210 instructs the display device 270 to display the generated image. As the instruction for display has been received, the display device 270 displays the determination screen. After step ST64 in the processing, the processor 210 returns to step ST51.

The determination screen represents a screen that notifies the increase-or-decrease value, the monthly increase-or-decrease value, and the yearly increase-or-decrease value that have been determined to the operator of the terminal apparatus 200. The determination screen includes, as an example, an image indicating the increase-or-decrease value, the monthly increase-or-decrease value, and the yearly increase-or-decrease value that are included in the determination notification received at step ST54, and the monthly participation ratio and the yearly participation ratio.

With the V2G system 1 according to the embodiment, the control server 100 causes each of the electric power sources 320 that are able to actually participate in supplying of electric power to output a uniform electric energy to the electric power system 500. Thereby, such an event that, even though participation registration has been performed, and supplying of electric power has been ready, it is not possible to participate in supplying of electric power, which may occur in the V2G system according to the prior art, does not occur. Thereby, the control server 100 according to the embodiment prevents participation registration of users and a participation ratio from being reduced. That is, the control server 100 according to the embodiment makes it possible to increase participation registration and a participation ratio in supplying of electric power.

Furthermore, with the V2G system 1 according to the embodiment, the control server 100 grants an incentive to each of users actually participated in supplying of electric power. Thereby, the control server 100 according to the embodiment prevents participation registration of users and a participation ratio from being reduced. That is, the control server 100 according to the embodiment makes it possible to increase participation registration and a participation ratio in supplying of electric power.

Furthermore, with the V2G system 1 according to the embodiment, the control server 100 increases an amount of an incentive as a participation ratio increases. Thereby, the control server 100 according to the embodiment makes it possible to increase participation registration and a participation ratio in supplying of electric power.

Furthermore, with the V2G system 1 according to the embodiment, the control server 100 increases an amount of an incentive as a participation ratio in one month increases, and, furthermore, increases the amount of the incentive as a participation ratio in one year that is longer than one month increases. Thereby, the control server 100 according to the embodiment makes it possible to improve ratios of participation during both a shorter period of time such as one month and a longer period of time such as one year.

It is possible to modify the embodiment described above as described below. The V2G system 1 may start supplying of electric power without confirming whether or not supplying of electric power is possible. The confirmation may be one described in (A3) in the embodiment described above. In this case, the processor 110 in the control server 100 regards, as an actual participation user, the user identified by the user ID for which the value of the associated participation information is one corresponding to the unparticipated state, among the user IDs associated with the supply ID issued at step ST13 illustrated in FIG. 2, for example. In this case, there may be a user who is not able to perform supplying of electric power after supplying of electric power has started. The processor 110 changes the user who is not able to participate in supplying of electric power from the actual participation user to a non-participation user. Then, the processor 110 performs again step ST27 in the processing to calculate again a user supply energy and user electric power. Thereby, the processor 110 responds to a decrease in the number of actual participation users.

In the embodiment described above, an increase-or-decrease value includes a monthly increase-or-decrease value and a yearly increase-or-decrease value. However, an increase-or-decrease value may only include either a monthly increase-or-decrease value or a yearly increase-or-decrease value. That is, an increase-or-decrease value may be a monthly increase-or-decrease value. An increase-or-decrease value may be a yearly increase-or-decrease value.

In the embodiment described above, an increase-or-decrease value includes a monthly increase-or-decrease value and a yearly increase-or-decrease value. That is, an increase-or-decrease value is determined based on a monthly participation ratio and a yearly participation ratio. However, an increase-or-decrease value may be one acquired using a participation ratio during a period of time other than a period of one month and a period of one year. The increase-or-decrease value represents a value that increases as a participation ratio during the period of time increases.

In the embodiment described above, an increase-or-decrease value represents a ratio. However, the increase-or-decrease value may not represent a ratio.

In the embodiment described above, an increase-or-decrease value is determined based on a participation ratio. However, the processor 110 may use a number of times of actual participation to determine an increase-or-decrease value. In this case, an increase-or-decrease value represents a value that increases as a number of times of actual participation during a predetermined period of time increases. Even in this case, the control server 100 according to the embodiment makes it possible to increase participation registration and a participation ratio in supplying of electric power.

An apparatus other than the control server 100 may perform bidding of electric power. In this case, when an agreement has been concluded, the apparatus transmits supply instruction information to the control server 100. The supply instruction information represents information that instructs supplying of electric power to the electric system 500. Supply instruction information includes, for example, a total supply energy and a period of time of supply. The total supply energy and the period of time of supply are determined based on content of the bidding and a result of the agreement. The supply instruction information is received by the communication interface 150 in the control server 100. In response to reception of the supply instruction information, the processor 110 executes step ST14 and later steps in the processing illustrated in FIG. 2. At this time, the processor 110 uses the total supply energy and the period of time of supply that are included in the supply instruction information to perform step ST14 and later steps in the processing illustrated in FIG. 2.

In the embodiment described above, the vehicle 300 that includes the electric power source 320 outputs electric power. Instead of the vehicle 300, however, a moving body other than a motor vehicle may output electric power. The moving body includes the electric power source 320.

The electric power source 320 may not be one that a moving body includes. For example, the electric power source 320 may be installed in a building.

In the embodiment described above, supplying of electric power is performed based on a result of bidding and a conclusion of an agreement in an electric power market. However, supplying of electric power may be one that is determined without an electric power market interposed.

Each of the apparatuses according to the embodiment may include a plurality of apparatuses.

Each of the processor 110 and the processor 210 may be one where a part or a whole of the processing achieved by the programs in the embodiment described above is achieved by a circuit hardware configuration.

The programs that achieve the processing according to the embodiment are transferred in a state where the programs are stored in a non-transitory computer-readable storage medium in an apparatus, for example. However, the apparatus may be transferred in a state where the programs are not stored. The programs may then be separately transferred, and written into the apparatus. It is possible to achieve the transferring of the programs at this time in such a manner that the programs are recorded in a removable non-transitory computer-readable storage medium, or otherwise the programs are downloaded via a network such as the Internet or a LAN, for example.

Although the embodiment of the present invention has been described, the illustrated embodiment is a mere example and is not intended to limit the scope of the present invention. It is possible to implement the embodiment of the present invention in various aspects without departing from the gist of the present invention.

EXPLANATION OF REFERENCE NUMERALS

1 V2G system
100 Control server
110, 210 Processor
120, 220 ROM
130, 230 RAM
140, 240 Auxiliary storage
141 User DB
142 Record DB
150, 250 Communication interface
160, 280 Bus
200 Terminal apparatus
260 Input device
270 Display device
300 Vehicle
310 On-vehicle apparatus
320 Electric power source
400 Electric power supply apparatus
500 Electric power system

What is claimed is:

1. A controller comprising:
   a determiner that determines a number of participants representing a number of electric power sources that are able to actually participate in supplying of electric power to an electric system;
   an output controller that causes each of the electric power sources that are able to actually participate in the supplying to output, to the electric system, an electric energy determined by dividing a predetermined electric energy by the number of participants; and
   a granter that grants an incentive to users which use the electric power sources that actually participate in the supplying, wherein the granter increases an amount of the incentive as a participation ratio, which is a ratio of the electric power sources that actually participate in the supplying to the electric power sources that have registered to participate, increases.

2. The controller according to claim 1, wherein the granter Increases the amount of the incentive as the participation ratio during a first predetermined period of time increases, and increases the amount of the incentive as the participation ratio during a second predetermined period of time that is longer than the first predetermined period of time increases.

3. The controller according to claim 1, wherein the granter increases an amount of the incentive as a number of times of actual participation in the supplying increases.

4. A non-transitory computer-readable medium storing a program causing a processor included in a controller to function as:

a determiner that determines a number of participants representing a number of electric power sources that are able to actually participate in supplying of electric power to an electric system;

an output controller that causes each of the electric power sources to output, to the electric system, an electric energy determined by dividing a predetermined electric energy by the number of participants; and a granter that grants an incentive to users which use the electric power sources that actually participate in the supplying, wherein the granter increases an amount of the incentive as a participation ratio, which is a ratio of the electric power sources that actually participate in the supplying to the electric power sources that have registered to participate, increases.

5. A control method comprising:

determining a number of participants representing a number of electric power sources that are able to actually participate in supplying of electric power to an electric system;

causing each of the electric power sources to output, to the electric system, an electric energy determined by dividing a predetermined electric energy by the number of participants; and granting an incentive to users which use the electric power sources that actually participate in the supplying, the granting comprises increasing an amount of the incentive as a participation ratio, which is a ratio of the electric power sources that actually participate in the supplying to the electric power sources that have registered to participate, increases.

* * * * *